(12) United States Patent
Mestha et al.

(10) Patent No.: US 7,768,682 B2
(45) Date of Patent: Aug. 3, 2010

(54) METHOD AND APPARATUS FOR OPTIMUM BLACK COMPONENT DETERMINATION FOR GRAY COMPONENT REPLACEMENT

(75) Inventors: Lalit Keshav Mestha, Fairport, NY (US); Yao Rong Wang, Webster, NY (US); Alvaro Enrique Gil, Rochester, NY (US); Martin S. Maltz, Rochester, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 264 days.

(21) Appl. No.: 12/017,746

(22) Filed: Jan. 22, 2008

(65) Prior Publication Data

US 2009/0185230 A1    Jul. 23, 2009

(51) Int. Cl.
*G03F 3/08*    (2006.01)
(52) U.S. Cl. .................. 358/518; 358/1.9; 358/504; 382/167; 382/274; 345/604; 345/600; 345/589
(58) Field of Classification Search .................. 358/1.9, 358/504, 518; 382/167, 274; 345/604, 600, 345/589
See application file for complete search history.

(56) References Cited

U.S. PATENT DOCUMENTS

| | | | |
|---|---|---|---|
| 5,502,579 A | | 3/1996 | Kita et al. |
| 5,553,199 A | * | 9/1996 | Spaulding et al. ............ 358/1.9 |
| 5,636,290 A | | 6/1997 | Kita et al. |
| 6,072,901 A | * | 6/2000 | Balonon-Rosen et al. ... 382/167 |
| 6,157,469 A | * | 12/2000 | Mestha ........................ 358/504 |
| 6,636,628 B1 | * | 10/2003 | Wang et al. .................. 382/167 |
| 6,744,531 B1 | | 6/2004 | Mestha et al. |

OTHER PUBLICATIONS

R. Bala, "Device Characterization", Chapter 5, Digital Color Imaging Handbook, Guarav Sharma Ed., CRC Press, 2003.
R. Balasubramanian, R. Eschbach, "Design of UCR and GCR strategies to reduce moiré in color printing", IS&T PICS Conference, pp. 390-393 (1999).
R. Balasubramanian, R. Eschbach, "Reducing multi-separation color moiré via a variable undercolor removal and gray-component replacement strategy", Journ. Imaging Science & Technology, vol. 45, No. 2, pp. 152-160, Mar./Apr. 2001.

* cited by examiner

*Primary Examiner*—Benny Q Tieu
*Assistant Examiner*—Paul F Payer
(74) *Attorney, Agent, or Firm*—Oliff & Berridge, PLC

(57) ABSTRACT

A multi-dimensional printer profile look-up table for color correction is generated. First, an initial estimate for a black (K) component in a four-color color space for received color signals in the device independent color space is generated by using a three-dimensional parametric function. Next, initial estimates for the three non-black color components of the four-color color space are generated from the generated initial estimate for the black (K) component and the received color signals. Then, a printer profile including a map that maps the device independent color space to the four-color color space is generated using the generated initial estimates for the black (K) and the three non-black color components in the four-color color space.

15 Claims, 9 Drawing Sheets

METHOD AND APPARATUS FOR OPTIMUM BLACK COMPONENT DETERMINATION FOR GRAY COMPONENT REPLACEMENT

BACKGROUND

In image production systems that produce images on a recording medium, such as printers, photocopiers, facsimile machines and other xerographic devices, it is desired to control, as closely as possible, the actual perceived color of the output images. One known method to optimize image color output is to provide a look-up-table (LUT) that translates received color signals into optimized color signals for printing, for example, on a printer.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Adding black (K) as a fourth color in this manner usually saves cost, as black (K) ink is usually cheaper than colored ink, and allows more colors to be produced than were achievable with the original three primary colors. Controlled amount of black addition is considered useful for high quality printing. Having black gives better stability to prints in the presence of print variables (relative humidity, temperature, material latitude etc.,). Increased gamut for dark colors, as in DC8000, is also achieved with the addition of black toner. One major disadvantage in adding black is the excessive black in flesh tones, sky tones and other important tone scales can make these tone scales appear dirty/grainy or non-uniform with black toner. However, some key colors (e.g., flesh tones and sky tones) are sensitive to the addition of black and may not be perceived as optimal if too much black is added. The replacement of the inherent gray component of colors in a three-color space with a fourth, black (K) component is called gray component replacement (GCR) or under color removal (UCR). UCR is usually used when colors are near the neutral axis, such as, for example, the L* axis in L*a*b* space or the C=M=Y axis in CMY color space. GCR is similar to UCR, but can be used with colors throughout the color gamut, not just near or at neutral axes. The use of GCR and UCR is known to facilitate the production of pleasing color outputs, optimal gamut, and to improve constraints on area coverage.

Traditionally, determination of the black (K) component in a target color system was done in an ad hoc way by experienced practitioners. This method has the disadvantages of requiring experienced personnel, being generally irreproducible, being costly, and being time-consuming.

Another method used to transform colors in a three-dimensional color space, such as CMY color space, to a four-color color space, such as CMYK color space, is to determine the black (K) component by a one dimensional function that relates the black (K) component as a one-dimensional function of the other components. In the CMY color space, for example, the function K=min (C, M, Y) can be used. This method has the disadvantages of not producing sufficiently optimized colors for the entire color gamut, especially for specialized, or key, colors such as, for example, skin tones.

In another method, a flexible method for estimating the black (K) component comprises (1) determining a maximum black (K) component, (2) adjusting the black (K) component amounts based on chroma, and (3) determining the other color components. In examples of this method, disclosed in U.S. Pat. No. 5,502,579 to Kita et al. (Kita '529) and U.S. Pat. No. 5,636,290 to Kita et al. (Kita '290), input image signals are transformed by a four-input-three output controller to L*a*b* color space. The disclosure of each of Kita '529 and Kita '290 is incorporated herein by reference in its entirety. A chroma determining means determines chroma signal C* from a* and b*. A UCR ratio calculation means calculates an UCR ratio α from the chroma signal C*. The L*a*b* and UCR ratio α are then converted into the CMYK output. This method also has the disadvantages of not producing sufficiently optimized colors for the entire color gamut.

In another method, disclosed in U.S. Pat. No. 6,744,531 to Mestha et al. (Mestha), incorporated herein by reference in its entirety, consistent output across multiple devices is obtained. For a given device, received device independent image data are stored as target image data and also converted by a data adjustment subsystem to printable image data based on the color space of the device. The printable image data is printed. An image sensor senses the printed image data and outputs detected device independent image data to the data adjustment subsystem. The data adjusting subsystem compares the detected device independent image data with the stored target image data and, based on the comparison, determines adjustment factors that are used to conform the printable image data output by the data adjusting subsystem to colors mandated by the device independent image data.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of L*. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K would be constrained to be less than a threshold. A second constraint is to constrain K to be a subset of the range between the minimum and maximum allowed K values.

Another method is discussed in (1) R. Balasubramanian, R. Eschbach, "Design of UCR and GCR strategies to reduce moiré in color printing", IS&T PICS Conference, pp. 390-393 (1999) and (2) R. Balasubramanian, R. Eschbach, "Reducing multi-separation color moiré via a variable undercolor removal and gray-component replacement strategy", Journ. Imaging Science & Technology, vol. 45, no. 2, pp. 152-160, March/April, 2001. A UCR/GCR strategy is proposed that is optimized to reduce moiré. In this method, the UCR/GCR strategy is to characterize moiré as a function of the color components and to select optimized output color components when the moiré function is minimized.

SUMMARY

A method for generating a multi-dimensional printer profile look-up table for color correction includes receiving color signals comprising a plurality of nodes in a device independent color space; and, for each of the nodes: (1) generating, by a processor without user interaction and using the received color signals in the device independent color space, an initial estimate for a black (K) component in CMYK color space for the received color signals in the device independent color space, (2) generating initial estimates for cyan (C), magenta (M), and yellow (Y) components in the CMYK color space from the generated initial estimate for the black (K) component and the received color signals in the device independent color space, and (3) generating a printer profile comprising a map that maps the device independent color space to the CMYK color space using the generated initial estimates for the black (K), the cyan (C), the magenta (M), and the yellow (Y) components in the CMYK color space.

An apparatus for generating a multi-dimensional printer profile look-up table for color correction includes (1) an input module configured to receive color signals comprising a plurality of nodes in a device independent color space; (2) a black component estimation module configured to, for each of the nodes defined by the received color signals, generate, without user interaction and using the received color signals in the device independent color space, an initial estimate for a black (K) component in CMYK color space for the received color signals in the device independent color space; (3) a CMY estimation module configured to generate initial estimates for cyan (C), magenta (M), and yellow (Y) components in the CMYK color space from the generated initial estimate for the black (K) component and the received color signals in the device independent color space; and (4) a printer profile generation module configured to generate a printer profile comprising a map that maps the device independent color space to the CMYK color space using the generated initial estimates for the black (K), the cyan (C), the magenta (M), and the yellow (Y) components in the CMYK color space.

BRIEF DESCRIPTION OF THE DRAWINGS

FIG. 4b shows simulation results for 1955 colors of one exemplary image forming apparatus using the K-function of FIG. 4a.

FIG. 4c shows simulation results for 1955 colors of one exemplary image forming apparatus using the K-function of FIG. 4a.

FIB. 8b shows the top view of the boundary of the color gamut for one exemplary image forming apparatus.

Figure 9:
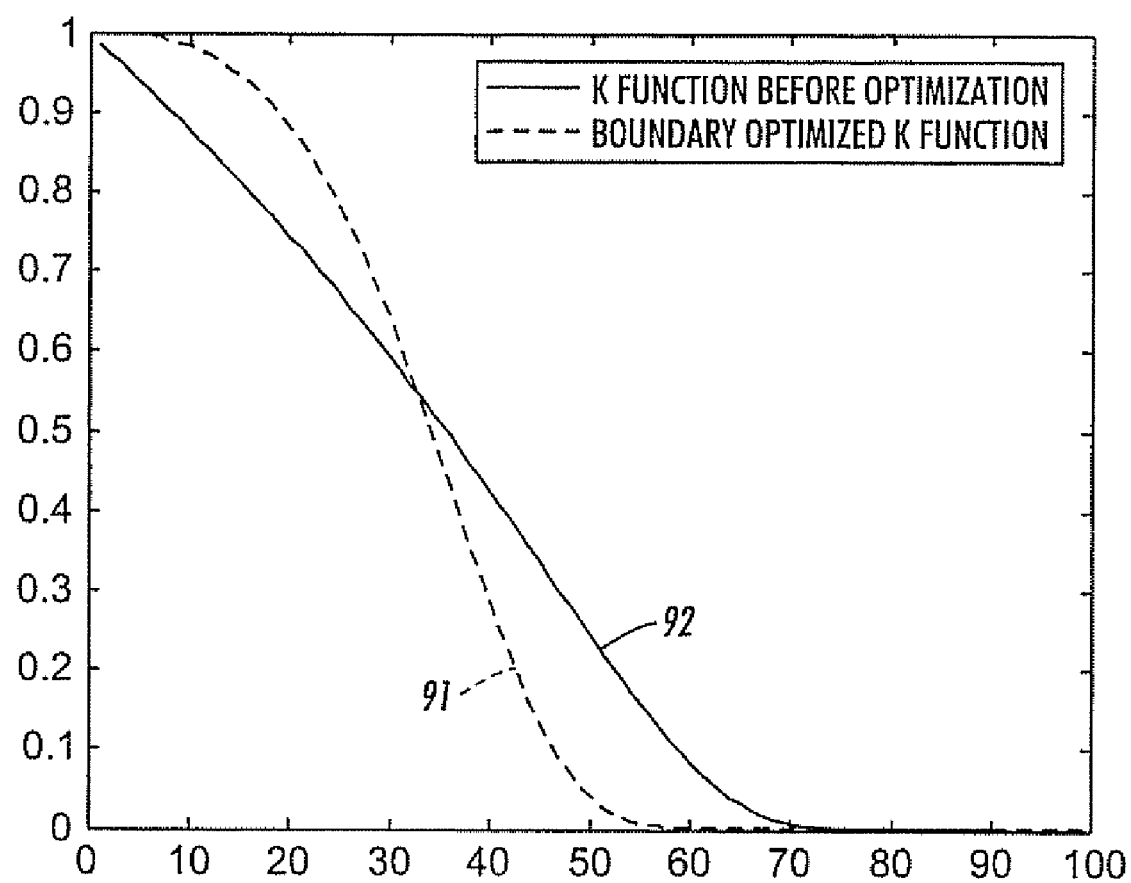

FIG. 9 shows a comparison of the K-function before and after optimization using the gamut boundary for one exemplary image forming apparatus.

EMBODIMENTS

Embodiments disclose explicit control of the black (K) component to be printed by determining the required black (K) component as a function of the requested color that is specified in a three-dimensional device independent color space. In preferred embodiments, the device independent color space is an isoperceptive color space (that is, a color space which exhibits distances between colors proportional to the distances between the colors as perceived by human eyes). More preferably, the device independent and isoperceptive color space developed by the Commission internationale de l'éclairage, the international authority on light, illumination, color, and color spaces, in 1973, the L*a*b* color space or CIELAB L*a*b*, can be used.

The function used to generate the black (K) component can be a parametric multi-dimensional function and is referred to herein as the K-function or K-restricted profiling. The K-function produces first estimated values for the black (K) component based on the requested colors as specified in the device independent color space such as L*a*b*. The first estimated values for the black (K) component are then used to produce first estimated values for the other color component values in a target color space, for example, for Cyan (C), Magenta (M), and Yellow (Y), if the four-color color space of Cyan-Magenta-Yellow-Black (CMYK) is used. The first estimated values for the other color components in the target color space are determined from the first estimated values of the black (K) component and the requested colors specified in the device independent color space. In embodiments, the first estimated values for the black (K) component and the other color components are then refined by an iterative procedure using a printer model. In other embodiments, the first estimated values for the black (K) component and the other color components can be refined on an actual printer using the K-function directly on the printer.

The disclosed methods and apparatus provide a flexible device independent color space to black (K) function that provides desired control in the neutral and off-neutral regions of the target color space. The disclosed methods and apparatus further provide optimization of the mapping of colors from the device independent color space to the target color space by using a control algorithm, such as a three input-four output control algorithm, such as when producing a map, by inversion, from L*a*b* color space to CMYK color space, which produces accurate colors while optimally satisfying the constraints of the explicit K-function in most, if not all, of the regions of the target color space. The disclosed methods and apparatus further provide constraints on smoothness of the estimated black (K) values as a function of the device independent color space in those regions where the actual black (K) values must depart from the explicitly specified black (K) values in order to achieve the requested colors. The disclosed methods and apparatus are especially useful for determining accurate amounts of the black (K) component for neutral colors or fleshtone/skintone colors.

Figure 1:
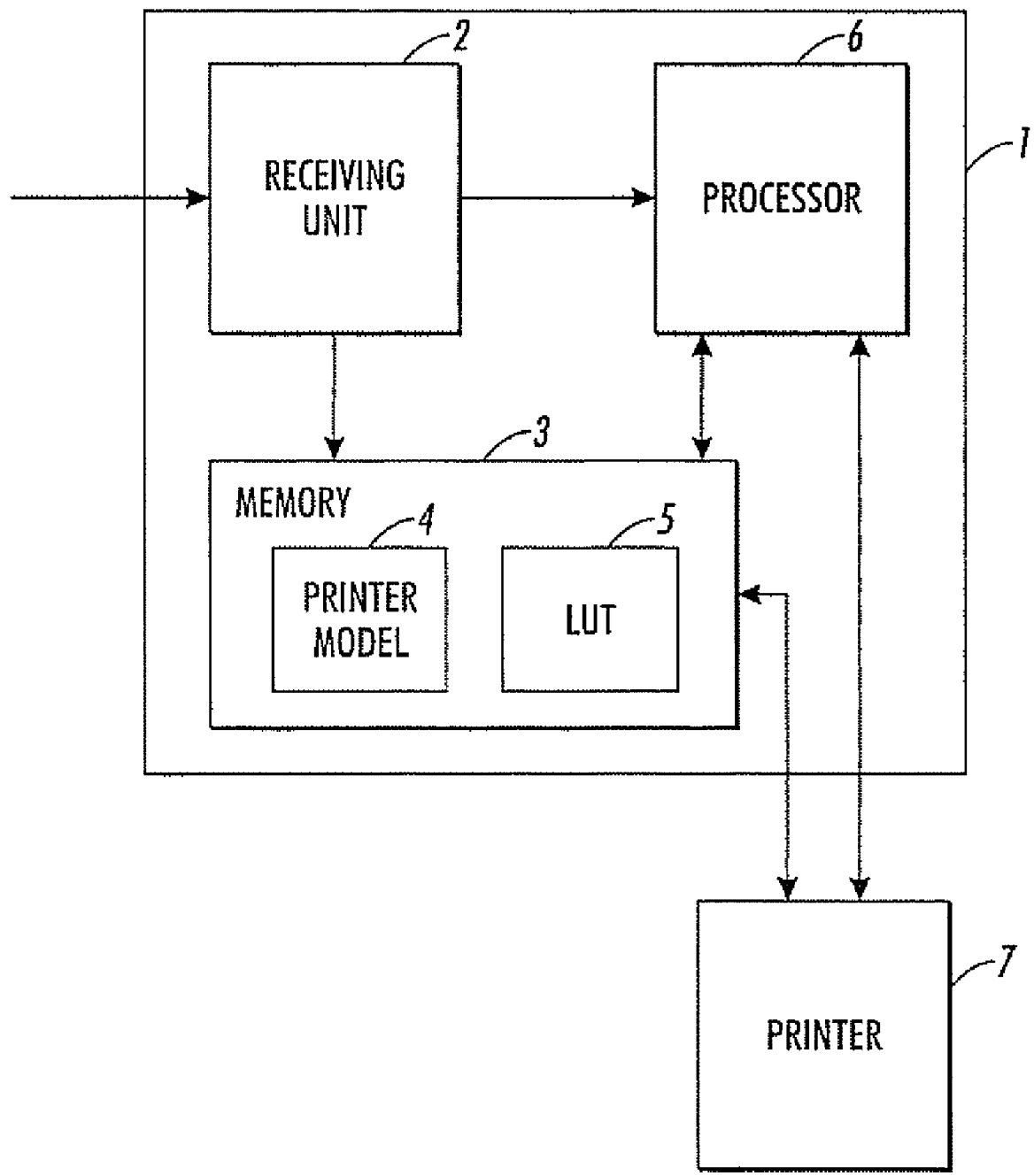
FIG. 1 shows an apparatus for color correction.

FIG. 1 is a block diagram showing an exemplary system 1 for generating a printer profile LUT according to embodiments. In this embodiment, the system 1 includes a receiving unit 2 that receives color signals to be printed or output. A memory 3 stores the received color signals and further stores a printer model 4 and, once generated, a LUT 5 that is the optimized printer profile LUT. The system 1 includes processor 6 that can be configured to implement any of the processing according to the various embodiments, including, but not limited to, three input-four output feedback controllers and four input-three output feedback controllers. System 1 is connected to printer 7. In embodiments, the optimized printer profile LUT 5 is generated on system 1 by use of printer model 4 and is thereafter provided to printer 7. In other embodiments, the printer profile LUT 5 is optimized by processor 6 using a feedback control loop that includes printer 7. While the system 1 is shown external to printer 7, in embodiments, system 1 can be wholly or partially included in printer 7.

Figure 2:
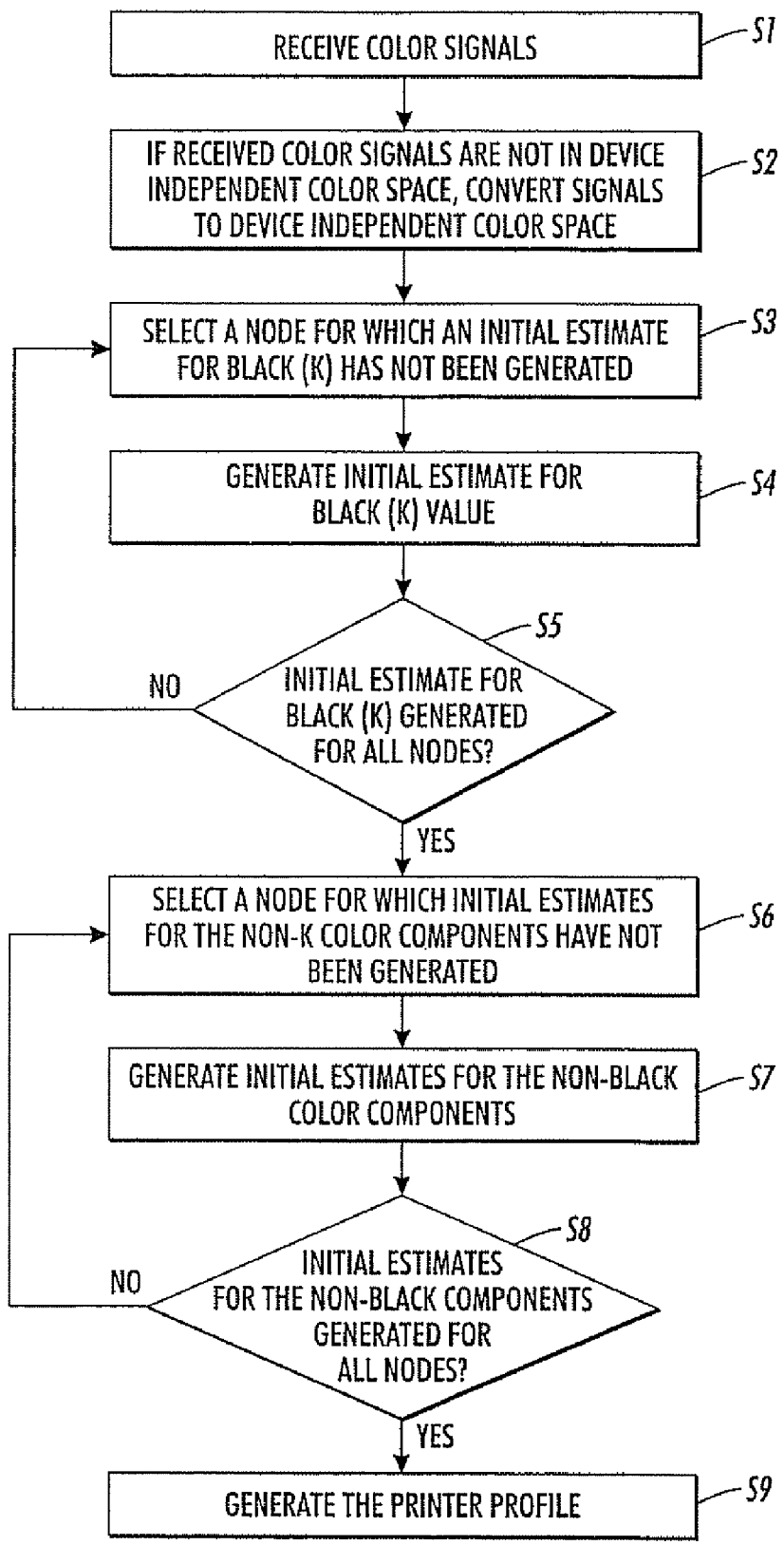
FIG. 2 shows a flowchart for color correction.

FIG. 2 shows a flowchart of one process of generating an optimized multi-dimensional printer profile look-up table for color correction. At step S1, color signals are received defining a plurality of nodes in a device independent color space. If the received color signals are not in the device independent color space, the received color signals are translated at step S2 into the device independent color space. For each of the nodes in the independent color space, an initial estimate for the black (K) component in the target color space is generated, such as by processor 6, at steps S3-S5 without user interaction and using the received color signals in the device independent color space. The target color space includes axes for black (K) and at least three other components. Once the black (K) component is generated for all nodes in the target color space, initial estimates for the non-black components in the target color space are generated, such as by processor 6, at steps S6-S8, from the generated initial estimate for the black (K) components and the received color signals in the device independent color space. Once initial estimates have been generated for all the color components of all the nodes in the target color space, a printer profile comprising a map that maps the device independent color space to the target color space is generated at step S9 from the initial estimates for the black (K) component and the other components in the target color space.

The initial estimate for the black (K) component in the target color space includes generating the initial estimate for the black (K) component using a K-function. Preferably, the K-function is a parametric multi-dimensional function able to adjust the amount of black (K) component needed in different regions of the target color space.

When the CIELAB L*a*b* color space is used as the device independent color space, the K-function is defined by the function:

$$K = \frac{1}{U^\eta e^{-\alpha(a^{*2}+b^{*2})/L^{*2}}+1} - \frac{1}{2}U^\eta \quad \text{Equation 1}$$

where $$U = 2\left(\frac{1}{e^{-\beta\left(\frac{L^*}{L_0-L^*}\right)^2}+1} - \frac{1}{2}\right) \quad \text{Equation 2}$$

and $L_0$, $\eta$, $\beta$, and $\alpha$ are predetermined values, selected based on the color gamut and use of the system concerned.

$L_0$, $\eta$, $\beta$, and $\alpha$ are parameters of the multi-dimensional K-function which has the following properties:
(1) K–>1 when L*–>0 so that maximum value of K is used at the dark end of the color space.
(2) The function is symmetrical with respect to a* and b*, and K increases when the color is away from the neutral zone.
(3) K–>0 when L*–>$L_0$. Since $L_0$ is selected to be around 100, small amount of black will be used near the white.

Parameter $L_0$ affects the middle part of the curve near the neutral region, which is the place where most colors require adjustment to obtain pleasing appearance.

Typical values used for $\alpha$, $\beta$, and $\eta$ are: $\alpha$=0.01, $\beta$=1.5, and $\eta$=0.5. Such values are used, for example, for the iGen3 color gamut. A large value of $\alpha$ gives strong dependence of K on a* and b*, while a small value of $\alpha$ means that K is mostly determined by luminosity. The parameter $\eta$ determines the shape of the K-function curve at small L*. Larger value of $\eta$ means the K-function curve is more rounded at small L*. The parameter $\beta$ determines the shape of the K-function in the middle range of L*.

In cases, as the gamut boundary is approached, the valid K that can result in the requested L*a*b* value may have to deviate significantly from the black (K) value produced by application of equations (1) and (2). This can cause a big jump in the black (K) values between adjacent nodes in the resulting LUT, which, in turn, can cause artifacts during otherwise smooth transitions in images. One solution to this problem is to: (1) visit the nodes of the LUT that are closest to the gamut boundary (where big deviations between the specified and achievable black (K) values are expected); (2) solve for the color component values at each of these nodes of the LUT using any of the inversion techniques mentioned herein; and then (3) for a given node (e.g., node N), if there is a big difference between the final black (K) value at N and the initial estimate for the K value at a neighboring node of the LUT that has yet to be visited, adjust the initial K value at the neighboring node to fall within some pre-specified difference from the final K value for node N.

In embodiments, the black (K) component for a node yet to be visited can be constrained to be within a threshold value of the black (K) component of a previously finalized adjacent node.

In further embodiments, the initial estimate for the black (K) component for a node can be constrained to be a weighted average of the black (K) components of previously finalized, adjacent nodes.

Figure 3A:
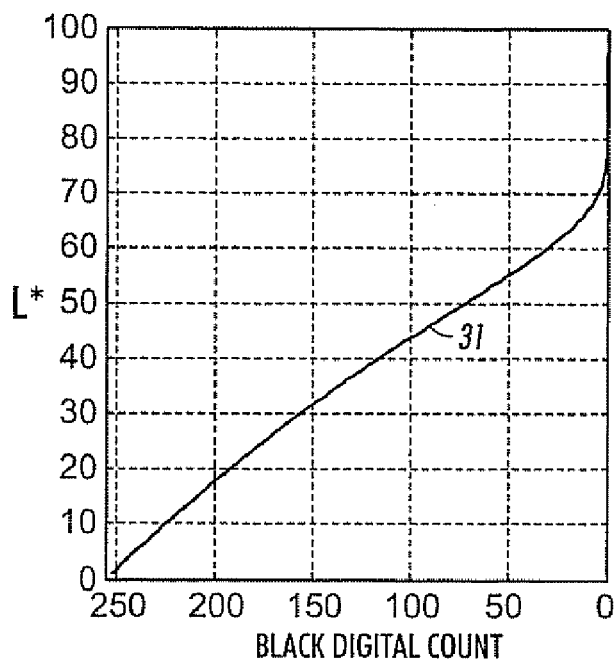
FIG. 3a shows a graph of a K-function for $a^*=0$ and $b^*=0$ for two different values of $L_0$.

FIG. 3a is a graph of a curve 31 of the K values (horizontal axis) as a function of L* (vertical axis), generated by equations (1) and (2) for a*=0, b*=0, and with $\alpha$=0.01, $\beta$=1.5, and $\eta$=0.5. Curve 31 shows that the calculated values for the black (K) component decreases with increasing L* (luminosity). This behavior is useful for a typical imaging device, since this curve uses less (or no) black for lighter colors and more black for darker colors. The black transition between lighter colors to darker colors is smooth, which is a requirement to avoid undesirable image artifacts such as image contours.

Figure 3B:
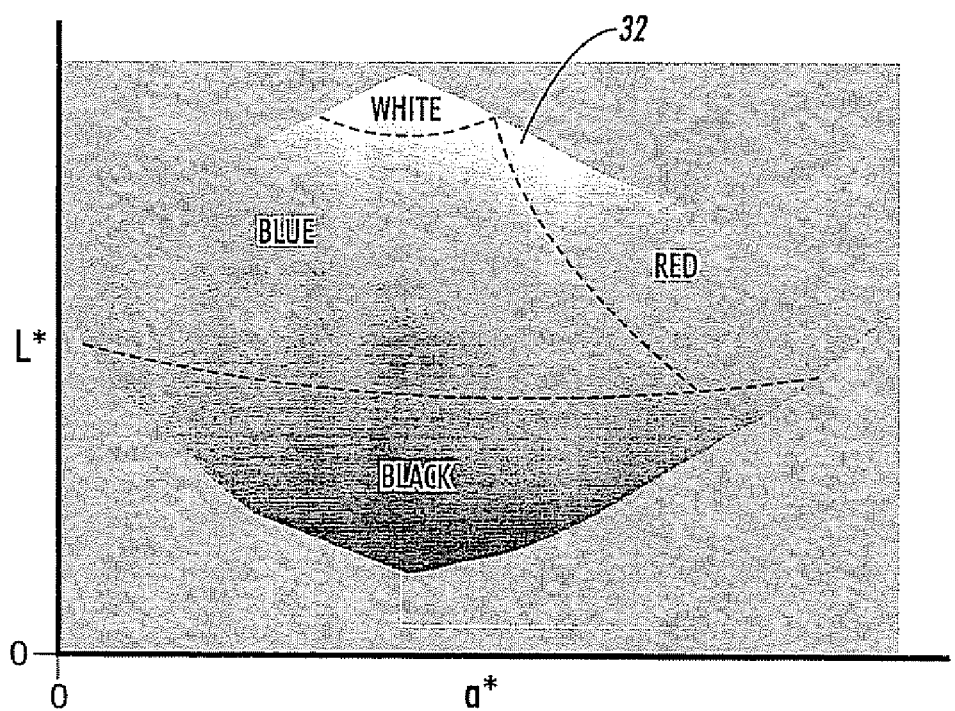
FIG. 3b shows a graph for the node colors of one exemplary image forming apparatus using the K-function generated with two different values of $L_0$.

FIG. 3b is a graph showing the color gamut 32 of one exemplary image forming apparatus as a function of L* (vertical axis) and a* (horizontal axis). The axes, L*, a* and b*, are device independent coordinates. The color gamut is the set of possible colors that can be reproduced within the printing system, which is a restricted space when compared to the set of all possible colors that the human visual system can see. Thus, the color gamut is the set of possible colors that can be reproduced within the printing system, which is a restricted space when compared to the set of all possible colors that the human visual system can see. The dashed lines delineating the different color regions of white, red, blue, and black are for descriptive purposes only and indicate the predominant colors of the color gamut regions. However, as can be seen in FIG. 3b, the color of the gamut boundary gradually transitions between one area to another as L* and a* are varied. All colors within the gamut can be printed by this imaging apparatus, while the colors outside the gamut cannot.

Figure 3C:
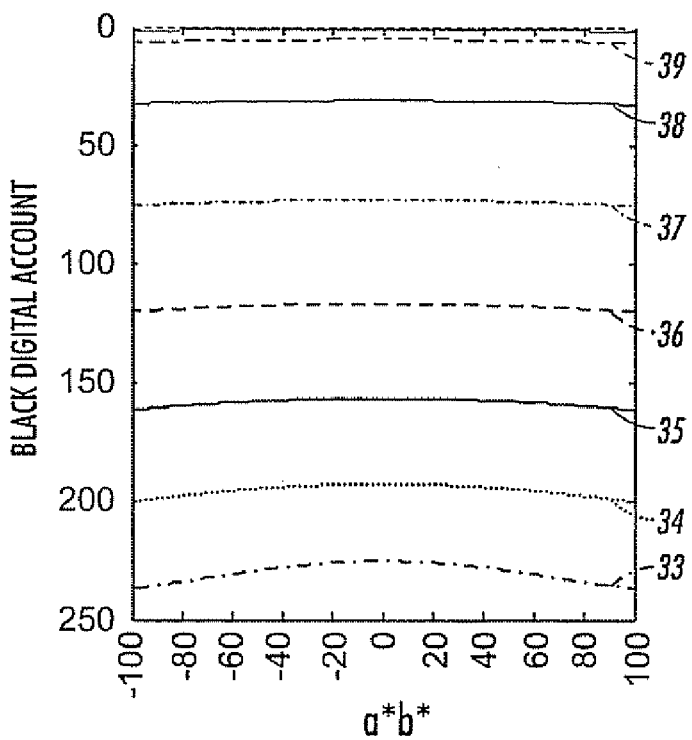
FIG. 3c shows the K-function using $a^*=0$ and $b^*=0$ for different values of $L^*$.

FIG. 3c is a graph showing curves 33-39. Each of curves 33-39 shows the K values (vertical axis) generated by a K-function as a function of a* or b* (horizontal axis) and using a*=0 (against b* as the horizontal axis) or b*0 (against a* as the horizontal axis) for different values of L*. Curves 33-39 show K values calculated using L*=70, 60, 50, 40, 30, 20, and 10, respectively, and show that the black (K) count decreases as L* (luminosity) increases. Further, curves 33-39 show that the K values are weakly dependent on the a* or the b* values.

Figure 4A:
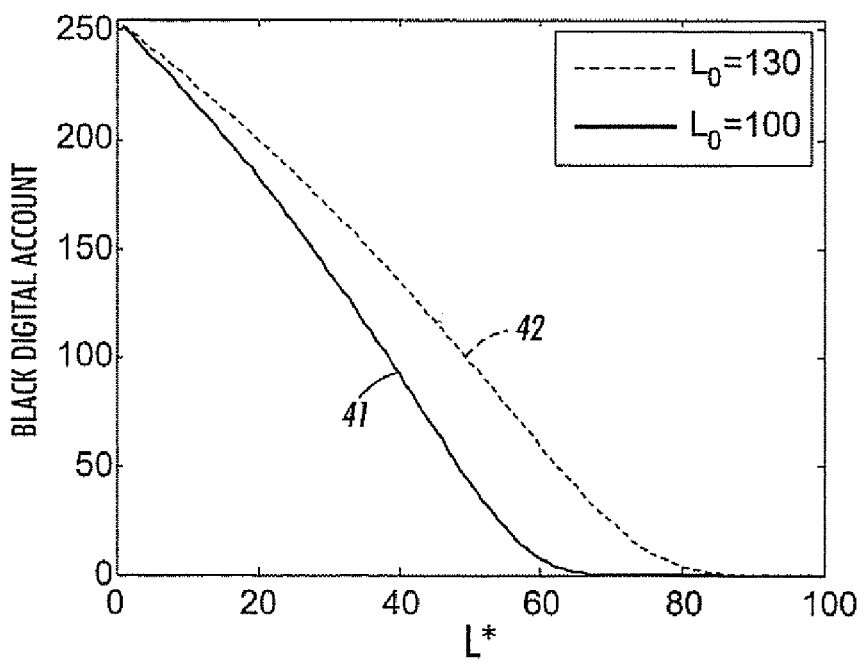
FIG. 4a shows K as a function of $L^*$ for $a^*=0$ and $b^*=0$ with $\alpha=0.01$, $\beta=1.5$, and $\eta=0.5$.

FIG. 4a is a graph of curves 41 and 42 showing K values (vertical axis) as a function of L* (horizontal axis) for a*=0, b*=0, α=0.01, β=1.5, η=0.5, and $L_0$. The parameter $L_0$ can be chosen to affect the middle of the curve. Curve 41 shows a graph of the K-function with $L_0$=100. Curve 42 shows a graph of the K-function with $L_0$=130. Curves 41-42 show that increasing $L_0$ reduces the black (K) component for higher values of L* (luminosity) and how the parameters $L_0$ can be chosen to affect the behavior of the K value.

Figure 4B:
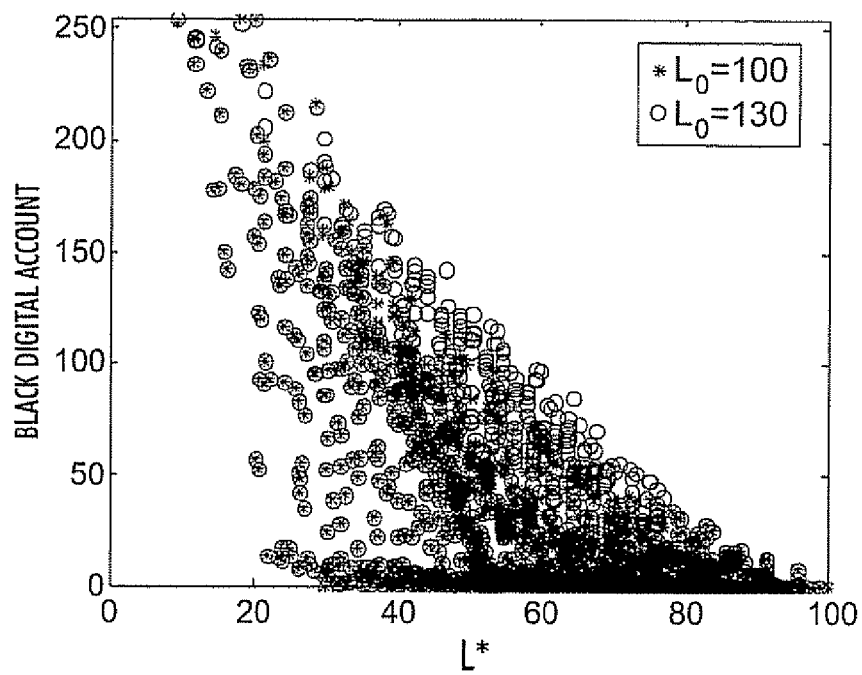

FIG. 4b is a graph of profile simulation results for K (vertical axis) as a function of L* (horizontal axis) for 1955 colors for an exemplary image forming apparatus using the K-function of FIG. 4a. More specifically, the node colors were determined using the K-function generated with two different values of $L_0$ ($L_0$=100 and $L_0$=130, as in FIG. 4a) as initial guesses, and then using an iterative 4-input (CMYK) and 3-output (L*a*b*) controller to converge to the target nodes. The results using $L_0$=100 are plotted with stars (the symbol *) and the results using $L_0$=130 are plotted with circles. The 1955 colors are the nodes used for the non-redundant control-based profiling of the image forming device gamut for building the ICC profiles (profiles in a format specified by the International Color Consortium).

Figure 4C:
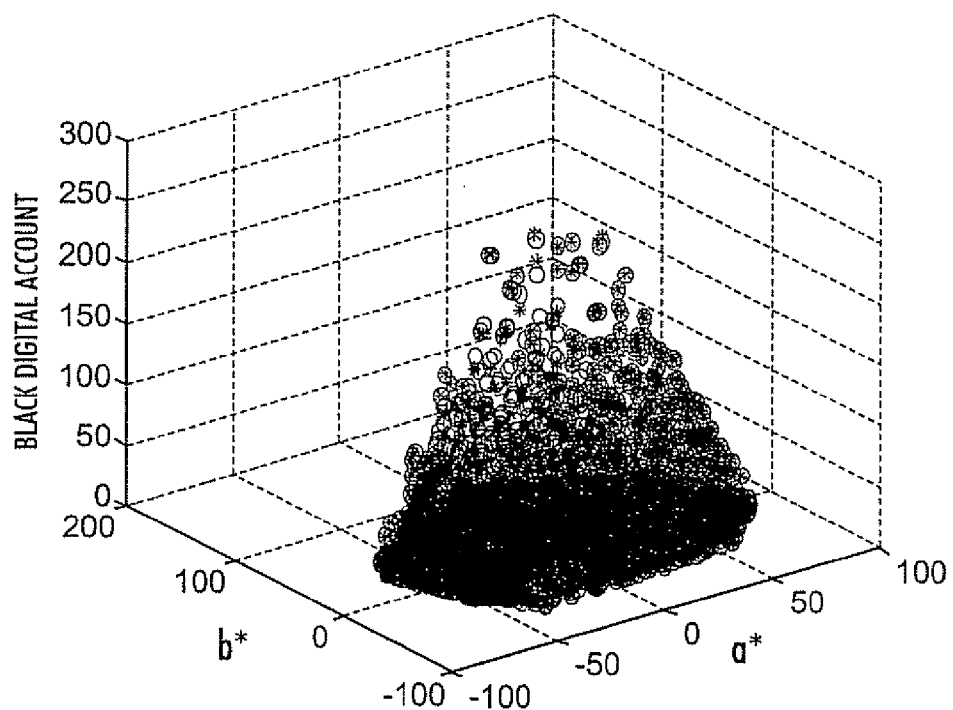

FIG. 4c is a graph showing profile simulation results for K (vertical axis) as a function of a* and b* (horizontal axes) for 1955 colors for the exemplary image forming device using the K-functions of FIG. 4a. Again, the 1955 colors are the nodes used for the non-redundant control-based profiling of the image forming device gamut for building the ICC profiles. The figure show the general trend that the K-values are lower for higher a* and b* values as designed by the multi-dimensional K-function, equation 1, and as can be visually seen in FIG. 3c.

Figure 5:
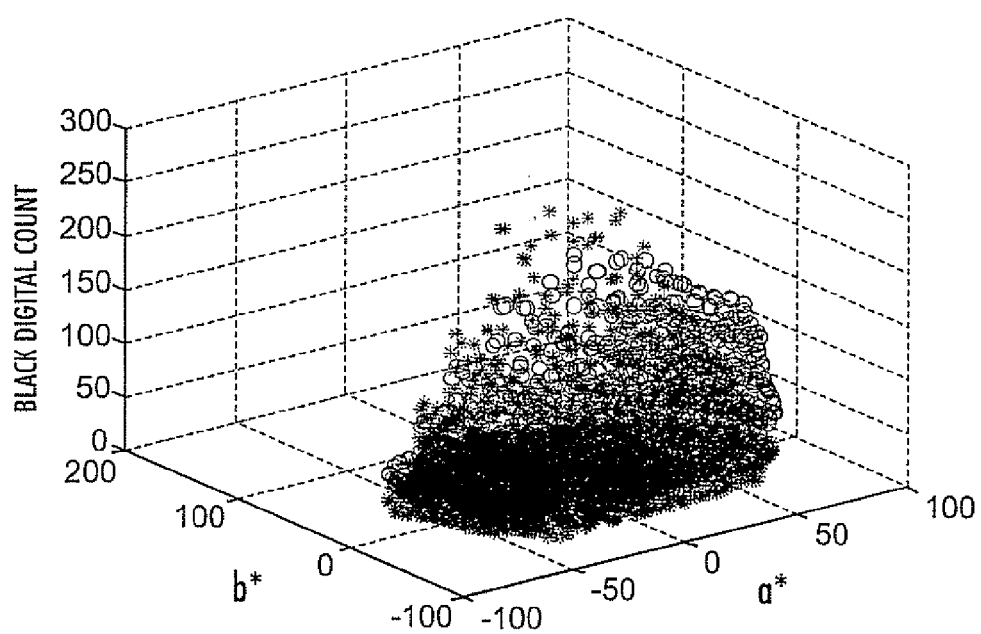
FIG. 5 shows the K values for $a^*$ and $b^*$ of the 1955 node colors of one exemplary image forming apparatus.

FIG. 5 is a graph showing the K values (vertical axis) as a function of a* and b* (horizontal axes) for the 1955 node colors for an exemplary image forming apparatus. The K values of the graph were calculated using equations (1) and (2) using the same parameters as in the curve of FIG. 3a. The K values calculated with $L_0$=100 are shown by stars and the K values calculated with $L_0$=130 are shown by circles. The K values were calculated with the same parameters as curve 31 of FIG. 3a (a*=0, b*=0, and with α=0.01, β=1.5, and η=0.5). These curves represent the converged K values for all a* and b* after simulating using iterative control based inversion on the printer model using the K-values from the function for two different $L_0$ values. Stars (the symbol *) represent the results when K values for $L_0$=100 were used and the circles represent the results when K values for $L_0$=130 were used. FIG. 5 shows that the K values calculated from equations (1) and (2) give reasonably good general shape in the multidimensional space.

Figure 6A:
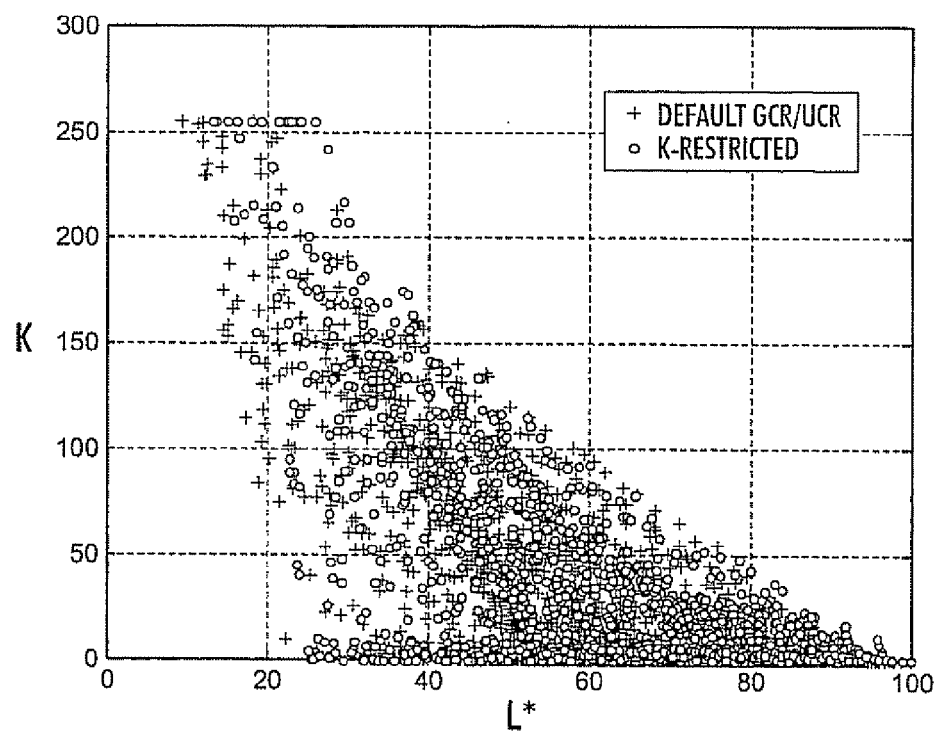
FIGS. 6a and 6b show a comparison of the K values for conventional GCR/UCR strategy and an embodiment.
Figure 6B:
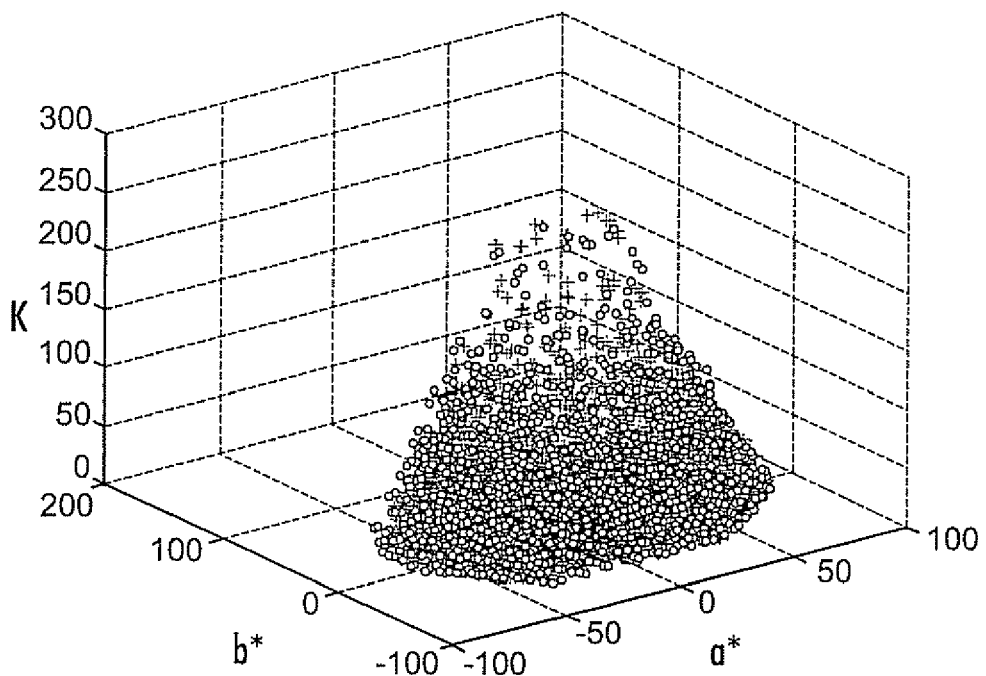

For comparison with current GCR/UCR strategy, FIGS. 6a and 6b are graphs showing the K values for experimental results for the K-restricted strategy (+marks) overlapped with GCR/UCR strategy (dots) for the exemplary image forming apparatus. FIG. 6a shows K values (vertical axis) as a function of L* (horizontal axis). FIG. 6b shows K values (vertical axis) as a function of a* and b* (horizontal axes). As shown, the K-restricted strategy uses more black (K) at low L* and less black (K) at the high L* end compared with the GCR/UCR strategy as shown in FIGS. 3a-3c. Experimental verification shows good accuracy for K-restricted GCR/UCR strategy. Also, images have shown improved accuracy and image quality (IQ), smoothing near difficult regions of the color gamut, and lower graininess in flesh tones and sky tones when a K-restricted GCR/UCR strategy is used.

In other embodiments, where the CIELAB L*a*b* color space is the device independent color space, the K-function is defined as:

$$K = \frac{1}{U^\eta e^{-\alpha[(a^{*2}-a_0^2)+(b^{*2}-b_0^2)]/L^{*2}}+1} - \frac{1}{2}U^\eta \qquad \text{Equation 3}$$

where $$U = 2\left(\frac{1}{e^{-\beta\left(\frac{L^*}{L_0-L^*}\right)^2}+1} - \frac{1}{2}\right) \qquad \text{Equation 4}$$

and where $L_0$, $a_0$, $b_0$, η, β, and α are predetermined values chosen based on the color gamut and system concerned.

This function has the following properties:
(1) K→1 when L*→0 so that the maximum value for the black (K) component is used at the dark end of the color space.
(2) The function is symmetrical with respect to a*-$a_0$ and b*-$b_0$, and K increases when the color is away from the neutral zone. The values $a_0$ and $b_0$ can be a function of L*. For example, if $a_0$ and $b_0$ are selected to be zero when L*=100, and one linearly interpolates to the a*, b*, and L* values at the gamut point, C=M=Y=255 and K=0, the k-function in equation (3) will be symmetrical around this new axis (e.g., the brown axis).
(3) K→0 when L*→$L_0$. Because K→0 when L*→100 for all image apparatus, $L_0$ is chosen to be around 100. Because $L_0$ is selected to be around 100 in embodiments, very small amounts of the black (K) component will be used near white areas.

Figure 7:
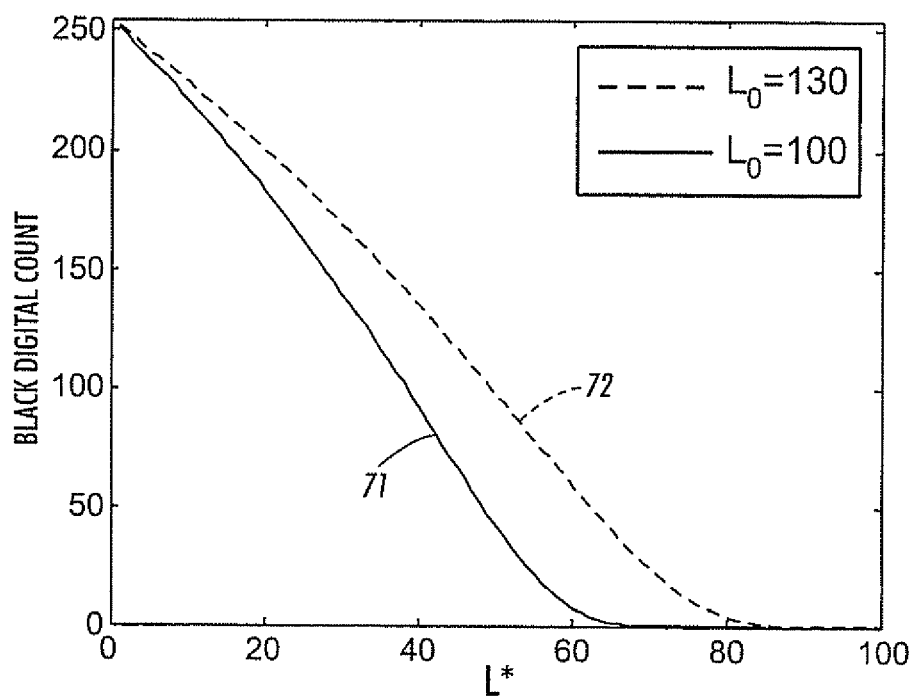
FIG. 7 is a graph showing K as a function of $L^*$ along the brown axis with $\alpha=0.01$, $\beta=1.5$, and $\eta=0.5$, $L_0=100$ for the blue line and $L_0=130$ for the red line.

FIG. 7 is a graph showing curves 71-72 that are plots of K values (vertical axis) as a function of L* (horizontal axis) for the K-function along the brown axis (a*-$a_0$=0 and b*-$b_0$=0) for the parameters of FIG. 3. Curve 71 shows the K-function evaluated with $L_0$=100 and curve 72 shows the K-function evaluated with $L_0$=130.

To set the parameters of equations (3) and (4), the information of the boundary of the color gamut of the target color space can be used, for which the solution of the mapping between the device independent color space and selected subsets of the target color space is unique.

Figure 8A:
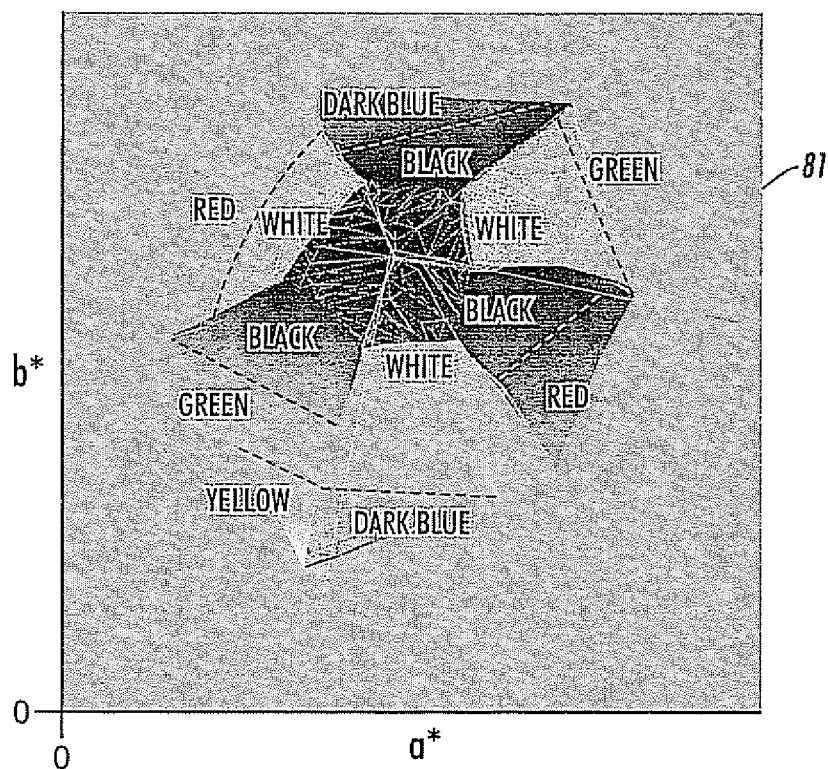
FIG. 8a shows the bottom view of the boundary of the color gamut for one exemplary image forming apparatus.
Figure 8B:
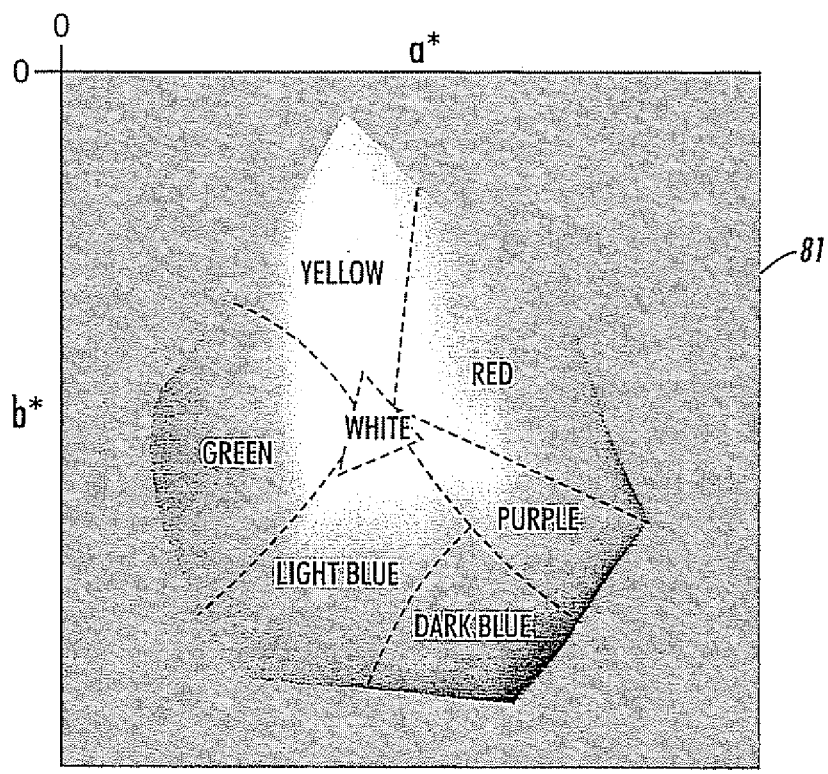

FIGS. 8a and 8b show the color gamut for an exemplary printing device. FIGS. 8a and 8b show the top view and bottom view, respectfully, of the color gamut as a function of b* (vertical axis) and a* (horizontal axis). In FIGS. 8a and 8b, the areas of the color gamut are generally indicated by as being white, yellow, green, red, dark blue, and black. These indications, and the dashed lines defining these color regions, are for descriptive purposes only, the colors of the color gamut changing gradually from one area to another as a* and b* are varied.

In a system where the device independent color space is the L*a*b* color space and the target color space is the CMYK color space, the solution of the mappings between the L*a*b* color space and CMY, CMK, CYK, and MYK color space subsets are unique. Other color information, such as the skin tone, sky color, etc. that are visually important can also be included in the optimization of the parameters of the K-function. Because the target color space would comprehend hundreds or thousands of colors, there is a need to systematically tune the parameters of the K-function in order to obtain the best possible fit between the amounts of black (K) desired for the colors of interest, such as colors on the gamut boundary, skin tones, etc., and the amount of black (K) obtained from the K-function.

In embodiments, the K-function parameters are tuned by the following procedure (described in relation to a system in which the device independent color space is the L*a*b* color space and the target color space is the CMYK color space):

(1) Define a list of desired black ($K_{desired}$) values with the corresponding L*a*b* values. Let the colors optimizing the K-function parameters be $\{CMYK_i, L^*a^*b^*_i\}$, i=1, 2, ...

(2) Tune the parameters of the K-function by minimizing $$J = \sum_i W_i [K_i - k(L^* a^* b^*_i)]^2 \qquad \text{Equation 5}$$

where $W_i$ is the weight for each color that is determined to be important relative to other colors, $K_i$ is the desired amount of black (K) component for the color described by $L^*a^*b^*_i$, and $k(L^*a^*b^*_i)$ is the amount of black (K) indicated by the K-function. Because there are four parameters ($\alpha, \beta, \eta, L_0$) to be optimized and the search space is huge, the simultaneous perturbation stochastic approximation (SPSA) method can be used to determine a local region where the parameters could achieve the minimization of equation (5). Other cost functions like deltaE2000, mean square error (MSE) and various norms of L*,a*,b* vectors can also be used. In mathematics, the term "norm" is used to describe the positive length or size of all vectors. For example, $L_2$-norms and Frobenius Norms are used as Euclidean norms. There are many others being used in Linear Algebra to describe the length between vectors.

(3) Perform a fine tuning of the parameters around the local region found in step (2) above using a brute force approach.

FIG. 9 is a graph showing curves 91-92 that are plots of the K values (vertical axis) for a K-function as a function of L* (horizontal axis) using one of the gamut boundaries for an exemplary image forming apparatus, where $W_i=1$ for all the boundary colors, which is different from the K values that were obtained without the use of the methods of this disclosure, Thus, smooth color balance, especially in flesh tones is achievable.

Once the initial estimates for the black (K) components are generated, these values are used to generate initial estimates for the other colors of the target color system. Thus, in a system where the target color space is the CMYK color space, the initial values for the cyan (C), the magenta (M), and the yellow (Y) components need to be estimated. In such systems where the target color space is a four color space, the initial estimates for the three non-black values can be generated by using a three-input three-output control loop to iteratively calculate the initial estimate of the component values.

For example, the initial estimates for the non-black components of the target color system can be generated by inverting a printer model comprising a 3-D look-up table (LUT) by using the generated initial estimate for the black (K) component and by using one of iterative automatic spot color editor (ASCE) processing and moving matrix algorithm processing, the printer model modeling a printer that converts values in the target color space into the device independent color space.

In embodiments, the printer model is updated using measurements with profile patches. For example, for the CMYK color space as the target color space, updating the printer model includes, for each of a selected number of the nodes can include:

(a) printing a patch using the generated cyan (C), magenta (M), yellow (Y), and black (K) components;

(b) measuring cyan (C), magenta (M), yellow (Y), and black (K) components of the printed patch;

(c) calculating change in values between the generated cyan (C), magenta (M), yellow (Y), and black (K) components and the measured cyan (C), magenta (M), yellow (Y), and black (K) components of the printed patch;

(d) generating new cyan (C), magenta (M), yellow (Y), and black (K) components for the node; and (e) determining, using the calculated change in values between the generated cyan (C), magenta (M), yellow (Y), and black (K) components and the measured cyan (C), magenta (M), yellow (Y), and black (K) components of the printed patch, whether further iteration is required, and if so, returning to step (a).

Once the initial estimated values for the colors of the target color system are generated, the initial estimated color component values are used to generate a map that maps the device independent color space to the target color space. In embodiments, this process is implemented by a three-input four-output feedback controller using a printer profile for an actual four-input three-output printer. Further, the three-input four-output feedback controller can use one of multiple input multiple output state feedback and model predictive feedback.

In variations, generating the map that maps the device independent color space to the target color space begins at nodes closest to boundaries of the printer gamut and thereafter progresses to nodes closer to the neutral axis.

Once the final values for the target color space are computed by any of the methods or apparatus disclosed above, these values can be used to generate an ICC profile from the map that maps the device independent color space to the target color space.

Alternatively, once a map that maps the device independent color space to the CMYK color space is generated, the map can be refined by iterative automatic spot color editor (ASCE) processing on a printer.

In embodiments, semi-real-time processing can be implemented using the profiling processes disclosed herein to enable the printer look-up-table to be calibrated in response to printer drift.

What is claimed is:

1. A method for generating a multi-dimensional printer profile look-up table for color correction, the method comprising the steps of:

receiving color signals defining a plurality of nodes in a device independent color space; and for each of the nodes:

generating, by a processor without user interaction and using the received color signals in the device independent color space and a K-function, an initial estimate for a black (K) component in a four-color color space for the received color signals in the device independent color space, the K-function being defined as:

$$K = \frac{1}{U^\eta e^{-\alpha(a^{*2}+b^{*2})/L^{*2}} + 1} - \frac{1}{2}U^\eta$$

where $$U = 2\left(\frac{1}{e^{-\beta\left(\frac{L^*}{L_0^*-L^*}\right)^2} + 1} - \frac{1}{2}\right)$$

and $L_o$, $\eta$, $\beta$, and $\alpha$ are predetermined values;

generating initial estimates for the non-black components in the four-color color space from the generated initial estimate for the black (K) component and the received color signals in the device independent color space, and generating a printer profile comprising a map that maps the device independent color space to the four-color color space using the generated initial estimates for the black (K) and the non-black components in the four-color color space.

2. The method according to claim 1, further comprising the steps of:

receiving input color signals;

determining the color space of the input color signals; and if the input color signals are determined to not be in the device independent color space, translating the input color signals into the device independent color space.

3. The method according to claim 1, wherein the K-function is a parametric multi-dimensional function.

4. The method according to claim 1, further comprising the step of:

optimizing the K-function parameters by tuning the K-function parameters by minimizing $$J = \sum_i W_i[K_i - k(L^*a^*b_i^*)]^2$$

where $W_i$, is the weight for each color, $K_i$, is the desired amount of black (K) component for the color described by $L^*a^*b^*_i$, and $k(L^*a^*b^*_i)$ is the amount of black (K) indicated by the K-function.

5. The method according to claim 1, wherein the step of generating initial estimates for the non-black components in the four-color color space includes using a iterative control loop to iteratively calculate the non-black components.

6. The method according to claim 1, wherein the step of generating initial estimates for the non-black components in the CMYK color space includes:

inverting a printer model comprising a 3-D look-up table (LUT) by using the generated initial estimate for the black (K) component and by using one of iterative automatic spot color editor (ASCE) processing and moving matrix algorithm processing, the printer model modeling a printer that converts values in the four-color color space into the device independent color space.

7. The method according to claim 6, further comprising the step of:

updating the printer model using measurements with profile patches.

8. The method according to claim 7, wherein the step of updating the printer model includes, for a selected number of the nodes:

(a) printing a patch using the generated non-black components and the black (K) component;

(b) measuring non-black components and black (K) components of the printed patch;

(c) calculating change in values between the generated non-black components and the generated black (K) components and the measured non-black components and the measured black (K) components of the printed patch;

(d) generating new non-black components and black (K) components for the node; and (e) determining, using the calculated change in values between the generated non-black and black (K) components and the measured non-black and black (K) components of the printed patch, whether further iteration is required, and if so, returning to step (a).

9. The method according to claim 1, wherein the step of generating the map that maps the device independent color space to the four-color color space includes using a three-input four-output feedback controller using a printer profile for a four-input three-output printer.

10. The method according to claim 9, wherein the three-input four-output feedback controller uses one of multiple input multiple output state feedback and model predictive feedback.

11. The method according to claim 1, wherein the step of generating the map that maps the device independent color space to the four-color color space includes beginning at nodes closest to boundaries of a gamut of a printer and thereafter progressing to nodes closer to a neutral axis.

12. The method according to claim 1, further comprising, after the step of generating a map that maps the device independent color space to the four-color color space, the step of:

generating an ICC profile from the map that maps the device independent color space to the four-color color space.

13. The method according to claim 1, further comprising, after the step of generating a map that maps the device independent color space to the four-color color space, the step of:

refining the map that maps the device independent color space to the four-color color space by iterative automatic spot color editor (ASCE) processing on a printer.

14. An apparatus for generating a multi-dimensional printer profile look-up table for color correction, the apparatus comprising:

an input module configured to receive color signals defining a plurality of nodes in a device independent color space;

a black component estimation module configured to generate, for each of the nodes defined by the received color signals, without user interaction and using the received color signals in the device independent color space and a K-function, an initial estimate for a black (K) component in four-color color space for the received color signals in the device independent color space, the K-function being defined as:

$$K = \frac{1}{U^\eta e^{-\alpha[(a^{*2}-a_0^2)+(b^{*2}-b_0^2)]/L^{*2}} + 1} - \frac{1}{2}U^\eta$$

where $$U = 2\left(\frac{1}{e^{-\beta\left(\frac{L^*}{L_0^-L^*}\right)^2}+1} - \frac{1}{2}\right).$$

and $L_o$, $\eta$, $\beta$, and $\alpha$ are predetermined values;

a non-black estimation module configured to generate, for each of the nodes defined by the received color signals, initial estimates for non-black components in the four-color color space from the generated initial estimate for the black (K) component and the received color signals in the device independent color space; and a printer profile generation module configured to generate a printer profile comprising a map that maps the device independent color space to the four-color color space using the generated initial estimates for the black (K) and the non-black components in the four-color color space.

15. A method for generating a multi-dimensional printer profile look-up table for color correction, the method comprising the steps of:

receiving color signals defining a plurality of nodes in a device independent color space; and for each of the nodes:

generating, by a processor without user interaction and using the received color signals in the device independent color space and a K-function, an initial estimate for a black (K) component in a four-color color space for the received color signals in the device independent color space, the K-function being defined as:

$$K = \frac{1}{U^\eta e^{-\alpha[(a^{*2}-a_0^2)+(b^{*2}-b_0^2)]/L^{*2}}+1} - \frac{1}{2}U^\eta$$

where $$U = 2\left(\frac{1}{e^{-\beta\left(\frac{L^*}{L_0^-L^*}\right)^2}+1} - \frac{1}{2}\right).$$

where $L_o$, $a_o$, $b_0$, $\eta$, $\beta$, and $\alpha$ are predetermined values;

generating initial estimates for the non-black components in the four-color color space from the generated initial estimate for the black (K) component and the received color signals in the device independent color space, and generating a printer profile comprising a map that maps the device independent color space to the four-color color space using the generated initial estimates for the black (K) and the non-black components in the four-color color space.

* * * * *